US005210805A

United States Patent [19]

Geddes

[11] Patent Number: 5,210,805

[45] Date of Patent: May 11, 1993

[54] TRANSDUCER FLUX OPTIMIZATION

[75] Inventor: Earl R. Geddes, Livonia, Mich.

[73] Assignee: Ford Motor Company, Dearborn, Mich.

[21] Appl. No.: 864,094

[22] Filed: Apr. 6, 1992

[51] Int. Cl.[5] ...................... G10K 11/16; H04R 25/00

[52] U.S. Cl. ...................................... 381/71; 381/199; 381/201

[58] Field of Search .................. 381/199, 201, 71, 200

[56] References Cited

U.S. PATENT DOCUMENTS

| | | | |
|---|---|---|---|
| 4,65,549 | 5/1987 | Eriksson et al. | 381/71 |
| 1,969,704 | 8/1934 | D'Alton | 181/156 |
| 3,413,579 | 11/1968 | Sloan | 381/201 |
| 4,153,815 | 5/1979 | Chaplin et al. | 381/71 |
| 4,412,104 | 10/1983 | Fujita et al. | 381/199 |
| 4,473,906 | 9/1984 | Warnaka et al. | 181/206 |
| 4,480,333 | 10/1984 | Ross | 381/71 |
| 4,549,631 | 10/1985 | Bose | 181/156 |
| 4,669,122 | 5/1987 | Swinbanks | 381/71 |
| 4,677,676 | 6/1987 | Eriksson | 381/71 |
| 4,677,677 | 6/1987 | Eriksson | 381/71 |
| 4,736,431 | 4/1988 | Allie et al. | 381/71 |
| 4,783,817 | 11/1988 | Hamada et al. | 381/71 |
| 4,805,733 | 2/1989 | Kato et al. | 181/206 |
| 4,815,139 | 3/1989 | Erikkson et al. | 381/71 |
| 4,837,834 | 6/1989 | Allie | 381/71 |
| 4,876,722 | 10/1989 | Dekker et al. | 381/71 |
| 4,878,188 | 10/1989 | Ziegler, Jr. | 364/724 |

FOREIGN PATENT DOCUMENTS

| | | |
|---|---|---|
| 768373 | 8/1934 | France . |
| 2191063 | 12/1987 | United Kingdom . |

OTHER PUBLICATIONS

AES Bandpass Loudspeaker Enclosures Publication Nov., 1986.

*Primary Examiner*—Forester W. Isen
*Attorney, Agent, or Firm*—Roger L. May; Mark L. Mollon

[57] ABSTRACT

A transducer for use in an active noise cancellation system is particularly adapted for use as a motor vehicle exhaust muffler by physically designing the transducer to optimize magnetic flux with increases in temperature through the operating temperature range of the motor vehicle. The magnet material used to form the transducer is selected, and the load line which provides increased flux with increases in temperature is then equated to the ratio of the area of the gap to the length of the gap between the magnetic poles divided by the ratio of the area of the magnet to the length of the magnet; by equating the area of the gap to the length of the gap ratios at maximum B/H and the selected load range, the desired length of the magnet is derived since the area of the magnet is determined according to conventional criteria.

7 Claims, 2 Drawing Sheets

FIG 1
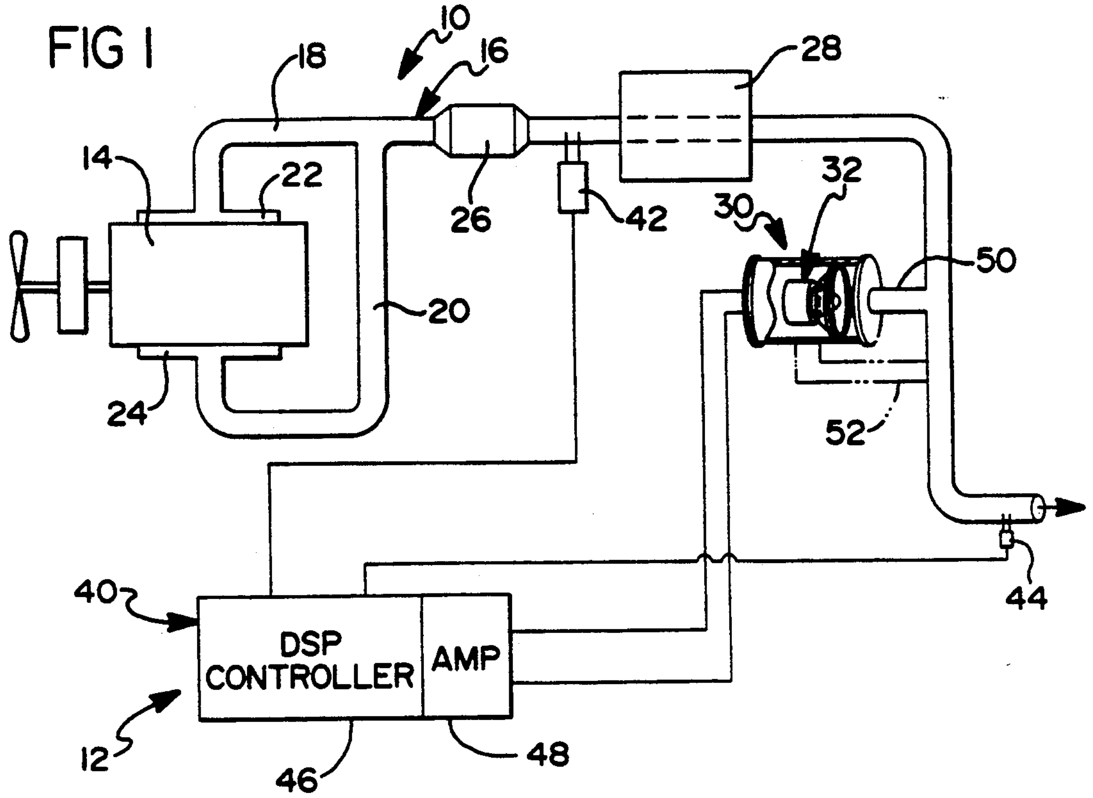
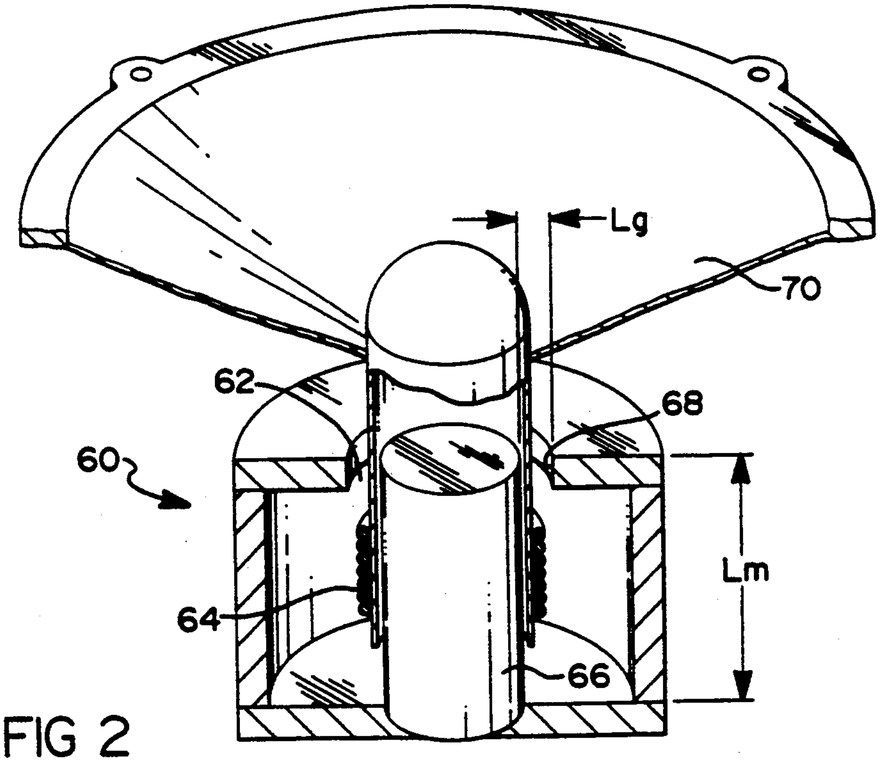
FIG 2

TRANSDUCER FLUX OPTIMIZATION

TECHNICAL FIELD

The present invention relates generally to active noise cancellation systems, and more particularly to transducers to be used in variable temperature environments such as motor vehicle exhaust systems.

BACKGROUND ART

Although active noise cancellation systems have been developed, particularly for use in building ventilation ducts, previously known systems are not well adapted for use in the environment of motor vehicles. A large of number of patents are directed to improvements in the electronics and signal processing techniques for generation of the noise cancellation signal. For example, U.S. Pat. Nos. 4,473,906 to Warnaka et al., U.S. Pat. No. 4,677,677 to Eriksson and U.S. Pat. No. 4,677,676 to Eriksson disclose systems for analyzing and producing the noise cancellation signals that must be delivered to a cancellation point. U.S. Pat. Nos. 4,876,722 to Decker et al and U.S. Pat. No. 4,783,817 to Hamada et al. disclose particular component locations which relate to the performance of the cancellation, but does not otherwise discuss how such systems are to be constructed, particularly in a manner which would render them applicable to muffle engine noise in the environment of a motor vehicle.

Moreover, the previously known systems often employ extremely large transducers such as 12 or 15 inch loud speakers of conventional construction. Such components are not well adapted for packaging within the confines of the motor vehicle, and particularly, within the under carriage of the motor vehicle. Moreover, the low frequency content of the signals which must be cancelled is on the order of 25 hertz. Furthermore, the highest frequencies encountered on the order of 250 hertz. Conventional wisdom suggests that a large loudspeaker would be necessary to generate sound signals with sufficient amplitude in that frequency range. Such speakers are particularly impractical to mount beneath the motor vehicle. Furthermore, while many of the prior art references teach installation of the speakers within the ducts carrying the sound pressure signal, such a mounting is impractical in the environment of motor vehicle exhaust conduits. In addition, while the limited area for exhaust conduit routing might suggest that the size of a speaker to be used in an active noise cancellation muffler would be reduced in size and compensated for by additional speakers of small size, such a multiplication of parts would substantially increase the cost of producing the active muffler system while at the same time having an adverse impact upon reliability of such a system.

In addition, from a production and manufacturing standpoint, the transducer and its driving circuit represents substantial portion of the cost of the system. In particular, the sensing and processing apparatus can be miniaturized to a great degree, and thus may have minimal packaging and materials impact. On the other hand, the speaker may include a large magnet, and the driving circuit includes power transformers to generate large amplitude signals required to drive the transducer or loudspeaker emitting the cancellation pulses. Moreover, the larger components in the power circuit increase cost not only by the expense of the individual components in the circuit but also by adding to the temperature compensation components and costs to control the heat generated in the power system.

Moreover, typical transducers are usually designed for optimum operation at room temperature environmental conditions. In contrast, the motor vehicle exhaust system typically attains temperatures hundreds of degrees above normal environmental temperatures. Depending upon the material used in the construction of the transducer magnet, the operating temperatures of the motor vehicle have an adverse impact upon the flow of flux through the magnetic flow path. In particular, it is well recognized that the flow of magnetic flux in typical transducers will diminish as the magnet is subjected to higher and higher temperatures. As a result, at the typical high temperatures of the vehicle operating environment, a substantially greater amount of power must be provided by the power circuit in order to operate the transducer at a level which will effectively cancel the noise pressure pulses passing through the exhaust conduit. Thus the use of conventional components in such system would substantially increase the cost as well as the packaging size of the components which must be used in order to provide active noise cancellation mufflers in motor vehicles.

TECHNICAL PROBLEM RESOLVED

The present invention overcomes the above-mentioned disadvantages by providing transducer magnet flux optimization throughout the operating temperature range of the motor vehicle. In particular, while features of the transducer construction may be constructed according to conventional design and manufacturing standards, the present invention provides particular design parameters for the conventional components in which the flux and demagnetizing force are maximized at the high, conventional operating temperatures for motor vehicle engines.

The overall construction of the transducer is consistent with conventional structure and design considerations to maximize efficiency of the conversion of electrical energy to mechanical energy. As a result, the poles of the magnet may be saturated, to reduce flux losses, the magnetic mass is determined according to the magnet material selected, and the coil is wound with an appropriate number of turns and proper diameter conductor to assure maximum force for displacement of the transducer diaphragm. The present invention emphasizes the dimensions of the gap and the magnet.

In particular, once the magnet material is selected, the ratio of the area of gap to the length of the gap between the magnet poles is related to the ratio of the area of the magnet to the length of the magnet by a constant factor of load. Thus, by adjusting the load presented by the dimensions of the gap and the magnet to a level at which the induction and demagnetizing force increase as a function of temperature, the present invention optimizes the flux through the transducer magnet within the operating environment of the motor vehicle, and reduces the amount of power which must be supplied to drive the transducer. In the preferred embodiment, the magnet would preferably be made of the ceramic material when the current cost differential between ceramic and better magnetic materials must be accommodated in the mass production of motor vehicle components. However, the material may be selected as desired without departing from the scope of the present invention. The selection of better magnetic material improves the performance of the magnet because the magnetic force desired can be obtained with substantially less mass and size. Thus, better magnetic materials such as the Alnico alloys, and preferably the Alnico 8*b* represented by curve 84 in FIG. 4, would alleviate mounting and packaging problems associated with larger, less powerful, magnetic materials previously relied upon in audio reproduction systems. Furthermore, the flatter demagnetization curve 84 of Alnico 8*b* provides greater tolerance to changes in demagnetization force since minor deviations in demagnetizing forces are less likely to force the induction to zero, resulting in complete demagnetization of the magnet.

Thus, the present invention provides improved performance transducers to be used in active noise cancellation systems for motor vehicle exhaust systems. The present invention optimizes the flow of magnetic flux by coordinating the dimensions of the air gap with respect to the dimensions of the magnet in a manner which assures increasing performance with increasing temperature throughout the range of operating temperatures for the motor vehicle power plant. Moreover, the present invention can be used to reduce the cost of the amplifier components and the magnet material used to the extent that the performance of the magnetic material improves as a function of temperature at a predetermined load governed by the dimensions of the magnetic path and the air gap.

DRAWING DESCRIPTION

The present invention will be better understood by reference to the detailed description of a preferred embodiment, when read in conjunction with the accompanying drawing in which like reference characters refer to like parts throughout the views and in which:

FIG. 1 is a diagrammatic view of an active noise cancellation system for motor vehicles including a transducer constructed according to the present invention;

FIG. 2 is a perspective view of a loud speaker constructed in accordance with the present invention;

BEST MODE

Figure 3:
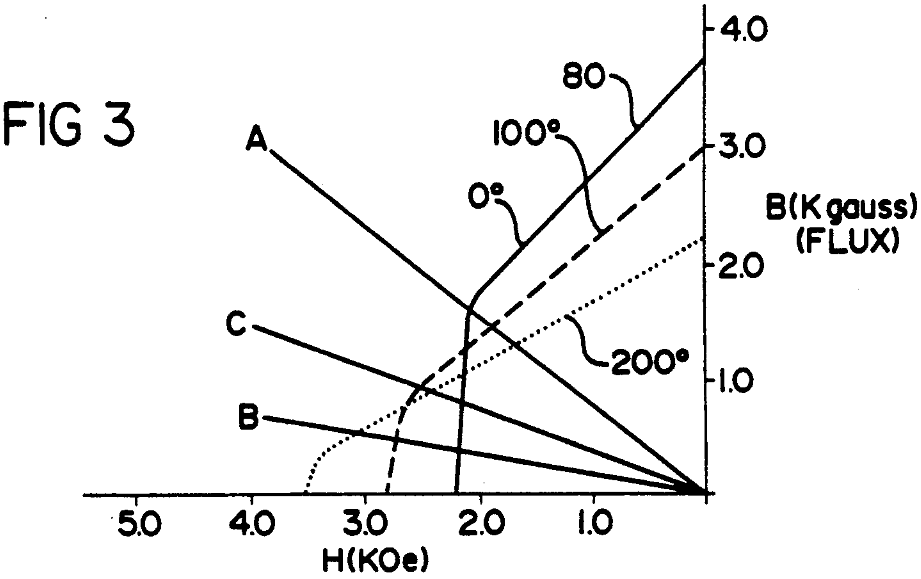
FIG. 3 is a graphic representation of the design criteria relied upon in constructing the speaker shown in FIG. 1.

Referring first to FIG. 1, a motor vehicle exhaust system 10 is as shown comprising an active noise cancellation system 12. The engine 14 includes exhaust conduit 16 communicating with header pipes 18 and 20 communicating with exhaust manifolds 22 and 24 respectively. As used herein, the conduit 16 refers generally to the path communicating with the headers 18 and 20 regardless of the individual components forming the passageway through which the exhaust gasses pass. For example, the catalytic converter 26 and the passive muffler accessory 28 form part of the conduit 16, while an active noise cancellation transducer housing 30 shown for the preferred embodiment carries a transducer or speaker 32 for communication with the conduit 16. With the housing 30, the transducer acoustically communicates with the conduit 16 through tuning ports such as 50 and 52, each communicating with an opposite side of the transducer 32.

Nevertheless, the housing 30 could also be constructed to support or form part of the conduit 16. Catalytic converter 26 and the passive muffler accessory 28 may be of conventional construction for such items and need not be limited to a particular conventional construction. For example, the passive muffler 28 may include simple noise damping insulation carried in a closed container, for example, as desired to reduce vibrations or otherwise dampen oscillation energy in susceptible portions of the conduit, or to combine the passive muffler accessory 56 with the active noise cancellation system 12.

Active noise cancellation system 12 includes active noise cancellation controller 40 cooperating with a sensor 42 and a feedback sensor 44 as well as a transducer 32 carried by the transducer housing 30. The electronic controller 40 includes a digital signal processing (DSP) controller 46 generating a control signal responsive to the signal representative of the detected noise from sensor 42 in order to generate an out of phase cancellation signal The control signal is then enhanced by an amplifier circuit 48 that provides a sufficient amplitude drive signal for the transducer 32 so that the transducer emits pressure pulses that match the level of sound pressure pulses as they pass the transducer port communicating with the conduit 16 in a known manner. Likewise, the controller adjusts the drive signal in response to detected pulses at sensor 44.

Referring now to FIG. 2, transducer 32 is shown comprising a magnet 60 including a gap 62 adapted to receive the coils 64 (shown below their correct position to clarify the drawing). Magnet 60 includes a slug defining a center pole 66 and ring and plate arrangement defining a body pole 68. The coil 64 is coupled to the diaphragm 70 by a sleeve, and as just described, the speaker construction is conventional and operates in a well known manner. In addition, the choice of using ring magnets or slug magnets will be determined in accordance with conventional loudspeaker design standards without departing from the scope of the present invention.

Figure 4:
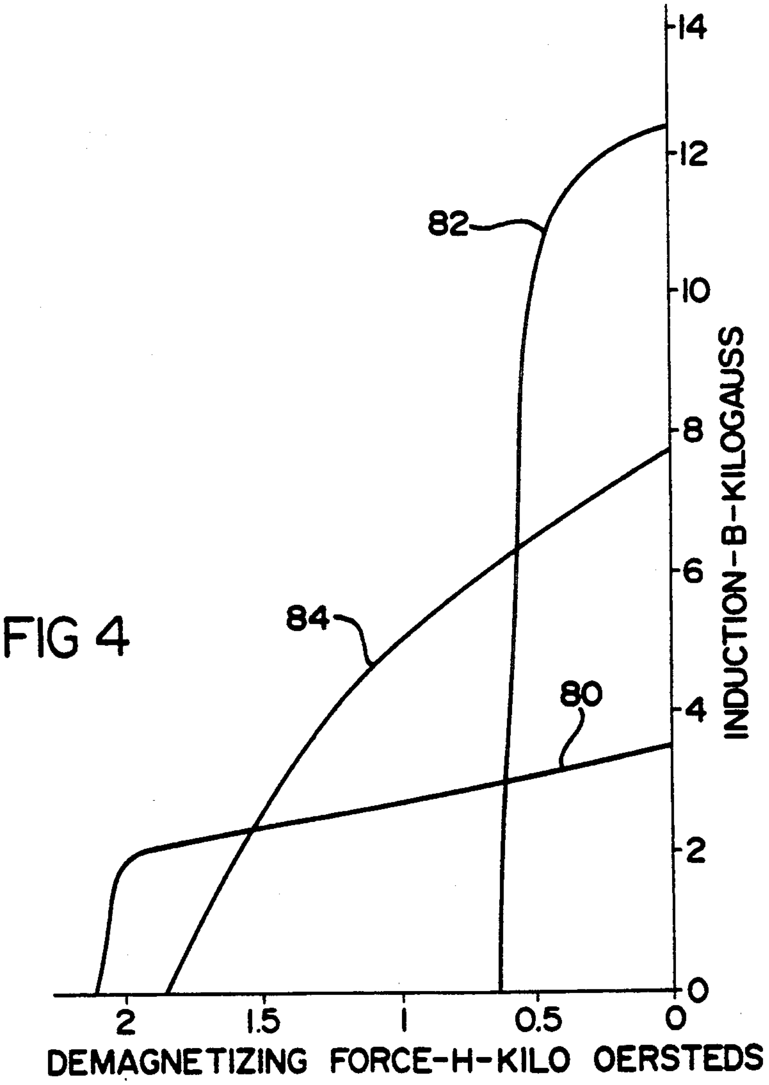
FIG. 4 is a graphical representation of different magnetic materials which may be employed in constructing a transducer according to the present invention.

In accordance with the present invention, the speaker material is selected in accordance with the flux and demagnetization force requirements of the magnet. The magnet 60 is made of a material selected for its intrinsic magnetization densities As demonstrated in FIG. 4, demagnetization curves demonstrate the differences in magnetization density of various materials Curve 80 demonstrates the characteristics of a ceramic magnet material. Curve 82 demonstrates the characteristics of Alnico 5 magnet material. Curve 84 represents characteristics of a magnet cast from Alnico 8*b*.

As demonstrated in FIG. 3, the demagnetization curve of a single material will vary depending upon the temperature of the magnetic material. As demonstrated by the changes in curve 80 in FIG. 3, the maximum flux decreases while the demagnetization force increases with increasing temperature. The permeance coefficient B/H represents a particular load within the magnetic circuit path. In particular, the load is related to the geometry of the magnet and the geometry of the gap at the poles of the magnet. In particular, the ratio of flux (B) to demagnetizing force (H) is related to the ratio of the area (Ag) of the gap to the length (Lg) of the gap divided by the ratio of the area (Am) of the magnet to the length (Lm) of the magnet. As a result, it will be understood that the load can be adjusted by configuration of the physical characteristics of the magnet so that the performance of the magnet is consistent or improves as the temperature of the magnet increases.

In particular, load line A represents a slope of about 1 and demonstrates that the flux capacity decreases as the temperature increases from 0° to 100° to 2000°. In contrast, load line B has a slope of approximately 0.2 and demonstrates that flux capacity increases about 0.18% per degree centigrade (° C.). Load line C represents an intermediate load condition at which the flux capacity increases about 0.12% per degree centigrade (° C.) from 0° to 100° C. and about 0.05% per degree centigrade (° C.) when the temperature is raised from 100° C. to 200° C. As a result, once the material of the magnet has been selected, and the shape of the magnet has been chosen, the length of the magnet can be readily determined.

For example, assuming that the permeance coefficient (B/H) equals 0.77, load line A equals the ratio of area of the gap to the length of the gap divided by the ratio of area of the magnet A to the length of magnet A. As a result, the ratio of area of the gap to the length of the gap equals 0.77 times the ratio of the area of the magnet A to the length of the magnet A. Correspondingly, where the permeance coefficient (B/H) for magnet B equals 0.17, the constant slope is also equal to the ratio of the area of the gap to the length of the gap divided by the ratio of the area of the magnet B to the length of the magnet B. Since the ratio of the area of the gap to the length of the gap would remain consistent in order to minimize flux losses at the gap regardless of whether magnet A or magnet B is to be used, the ratio of area to length of magnet A times 0.77 is made equal to the ratio of area to length of magnet B times 0.17. Furthermore, knowing that the area of the magnet B must be approximately three times the area of the magnet A, it is readily understood that the length of the magnet B is approximately 0.662 times the length of magnet A and the transducer is constructed accordingly as compared to traditional loudspeaker construction.

Similarly, while load C does represent the optimum increase in flux flow (B) per degree centigrade (° C.) of energy change, the permeance coefficient of 0.375 has also been multiplied by the ratio of the area to the length of the magnet C integrated to the ratio of the area of the gap to the length of the gap. Accordingly, where the area of the magnet C is approximately 1.7 times the area of magnet A the length of the magnet C would be approximately 0.828 times the length of magnet A constructed according to traditional criteria The traditional criteria include the general consideration that a speaker with a two pound magnet should be twice as good as a one pound magnet where both speakers employ a gap of the same volume, both speakers employ the same magnet material, and the magnets are properly matched to the gap in each case.

As a result, the present invention provides more efficient transducer operation by maintaining the magnetic force throughout the operating temperature. It will be appreciated that an increase in flux B with rising temperatures may be used to counteract reduced current caused by increased resistance in the transducer coil conductor since the force (F) equals flux (B)×inductance (L)×current (I). In addition, an amplifier need not generate the level of power that might otherwise be necessary to drive the transducer to counteract reduced flux resulting from exposure of conventionally designed transducers to increased temperatures. Furthermore, the present invention designs the transducer in accordance with a desired operating temperature range, for example, the operating temperature range of the motor vehicle exhaust components, and thus does not lose power as would a transducer constructed according to previously known standards. As a result, the present invention provides a substantial cost savings in the driving circuitry and provides packaging advantages over conventionally designed transducer systems in the motor vehicle environment. Accordingly, the present invention renders active noise cancellation more practical for use as mufflers for motor vehicle exhaust systems.

Having thus described the present invention, many modifications thereto will become apparent to those skilled in the art to which it pertains without departing from the scope and spirit of the present invention as defined in the appended claims.

I claim:

1. Method for constructing an audio transducer;

selecting a predetermined material for a magnet;

determining a B/H load at which the flux and the demagnetizing force increase as a function of temperature throughout a predetermined temperature range and;

constructing a magnet with the selected material having a central pole and a spaced outer pole section separated by a gap wherein the ratio of the area of the gap to the length of the gap, divided by the ratio of the area of the magnet to the length of the magnet, corresponds to the determined load.

2. The invention as defined in claim 1 wherein said selecting step comprises selecting a ceramic magnetic material.

3. The invention as defined in claim 1 wherein said selecting step comprises selecting an alnico magnetic material.

4. Method for constructing an active noise cancellation muffler for motor vehicle having at least one sensor for detecting a noise signal in an exhaust conduit and generating a representative signal, at least one transducer for communicating with the conduit at a fixed location, and a control for generating a cancellation signal having a phase opposite to said noise signal at said fixed location in response to said representative signal; the method comprising optimizing transducing flux throughout the operating temperature range of a magnet by selecting a material for constructing the magnet;

identifying a load at which flux and demagnetizing force increase as a function of increasing temperature throughout said range;

constructing a magnet with the selected material having a central pole and a spaced outer pole section separated by a gap wherein the ratio of the area of the gap to the length of the gap, divided by the ratio of the area of the magnet to the length of the magnet, corresponds to the identified load.

5. The invention as defined in claim 4 wherein said selecting step comprises selecting a ceramic magnetic material.

6. The invention as defined in claim 4 wherein said selecting step comprises selecting an alnico magnetic material.

7. A magnet for use in active noise cancellation mufflers for use in motor vehicles comprising:

a central pole section;

a body pole;

wherein said central pole is spaced from said body pole section a predetermined distance Lg;

wherein said central pole and said body pole have a cross-sectional area Ag;

said magnet having a cross-sectional area Am and a length Lm;

wherein the ratio of Ag/Lg is related to the ratio of

Am/Lm by a factor K determined as the slope of a load line where the magnetic flux and the demagnetization force increase as a function of increased temperature throughout the range of operating temperatures of the motor vehicle.

* * * * *

UNITED STATES PATENT AND TRADEMARK OFFICE

CERTIFICATE OF CORRECTION

PATENT NO. : 5,210,805

DATED : May 11, 1993

INVENTOR(S) : Earl R. Geddes

It is certified that error appears in the above-indentified patent and that said Letters Patent is hereby corrected as shown below:

Item 56 "References Cited", on title page of the patent, "4,65,549" should be --4,665,549--.

Column 1, line 14, after "large" delete "of".

Column 1, line 25, before "not" delete "does" and substitute --do--.

Column 1, line 38, after "encountered" insert --are--.

Column 1, line 58, after "circuit" delete "represents" and substitute --represent a--.

Column 4, line 46, after "densities" insert a period (.).

Column 4, line 48, after "materials" insert a period (.).

Column 5, line 5, delete "2000°" and substitute --200°--.

Column 5, line 49, after "criteria" insert a period (.).

UNITED STATES PATENT AND TRADEMARK OFFICE
CERTIFICATE OF CORRECTION

PATENT NO. : 5,210,805

DATED : May 11, 1993

INVENTOR(S) : Earl R. Geddes

It is certified that error appears in the above-identified patent and that said Letters Patent is hereby corrected as shown below:

Column 6, line 19, Claim 1, delete the semi-colon (;) and insert --comprising--.

Signed and Sealed this

Ninth Day of November, 1993

Attest:

Bruce Lehman

BRUCE LEHMAN

*Attesting Officer* *Commissioner of Patents and Trademarks*